United States Patent [19]

Shepley

[11] Patent Number: 5,224,804
[45] Date of Patent: Jul. 6, 1993

[54] TOOLING SYSTEM AND METHOD FOR BROACHING ENGINE COMPONENTS

[75] Inventor: Barry E. Shepley, Novi, Mich.

[73] Assignee: Ford Motor Company, Dearborn, Mich.

[21] Appl. No.: 796,982

[22] Filed: Nov. 25, 1991

[51] Int. Cl.[5] ............................................. B23D 37/22
[52] U.S. Cl. .................................. 409/244; 407/18; 409/279
[58] Field of Search .................. 409/244, 279; 407/16, 407/18, 19

[56] References Cited

U.S. PATENT DOCUMENTS

| 1,485,652 | 3/1924 | Wakefield | 407/16 |
| 1,939,820 | 12/1933 | Lapointe | 407/19 X |
| 4,294,568 | 10/1981 | Lipowsky et al. | 409/244 |
| 4,382,731 | 5/1983 | Rigdon | 409/248 |
| 4,693,813 | 9/1987 | Takeshita et al. | 409/244 |
| 4,768,904 | 9/1988 | Schmid | 409/262 |

FOREIGN PATENT DOCUMENTS

| 66183 | 1/1926 | Sweden | 407/19 |
| 1225716 | 4/1986 | U.S.S.R. | 409/279 |

Primary Examiner—Z. R. Bilinsky
Attorney, Agent, or Firm—Jerome R. Drouillard; Roger L. May

[57] ABSTRACT

A segmented broach bar for machining axially separated coaxial bearing bores contained within a component for an internal combustion engine includes axially separated pilot segments and axially separated broaching segments, with at least one of the pilot segments being positioned between a pair of broaching segments. A broach bar has a lead end which first engages the bearing bores, with the broaching and pilot segments having diameters which are sized progressively greater as the distance from the lead end increases, with the broach and pilot segments being sized such that each broach segment produces a bore diameter accommodating the immediately following pilot segment.

4 Claims, 4 Drawing Sheets

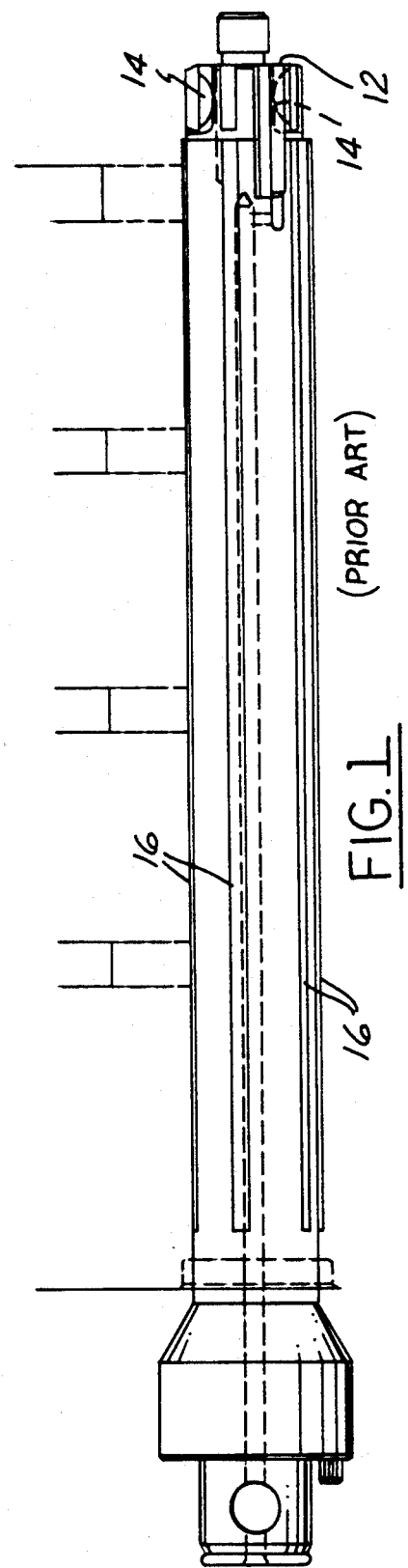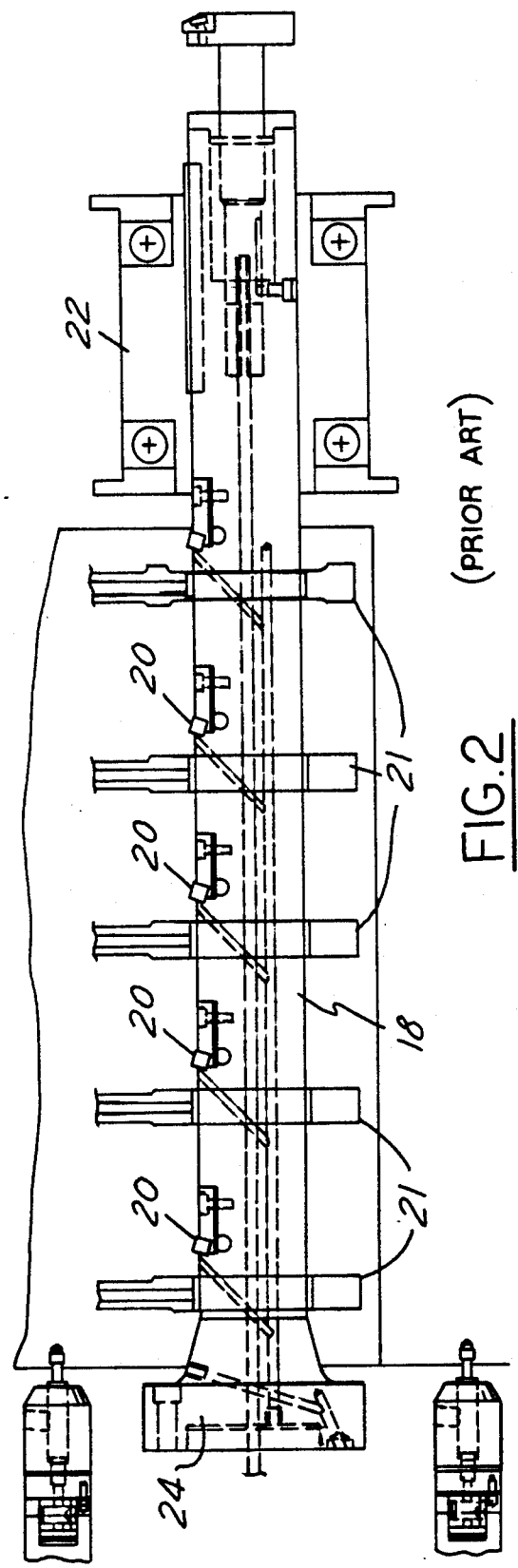

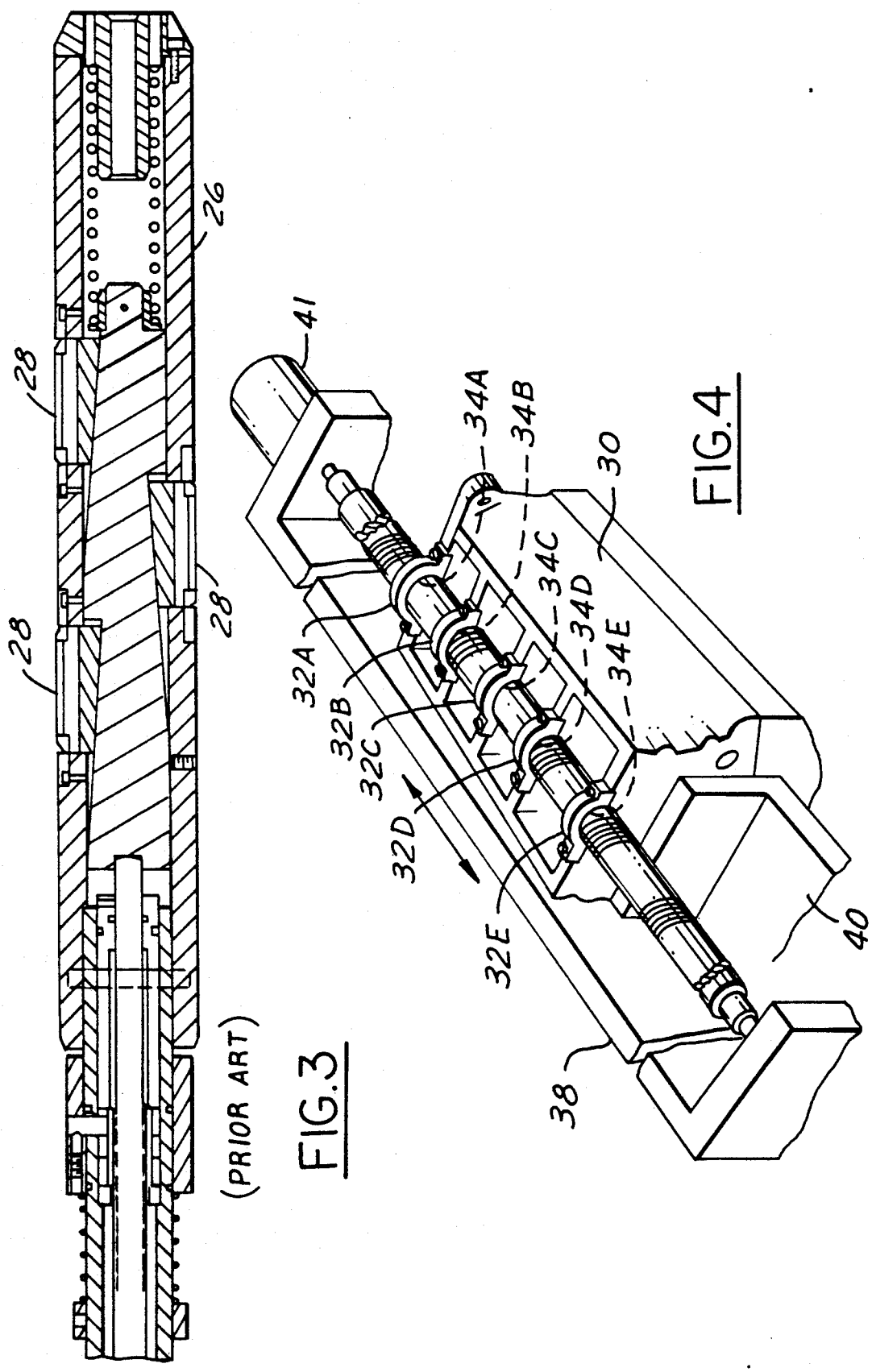

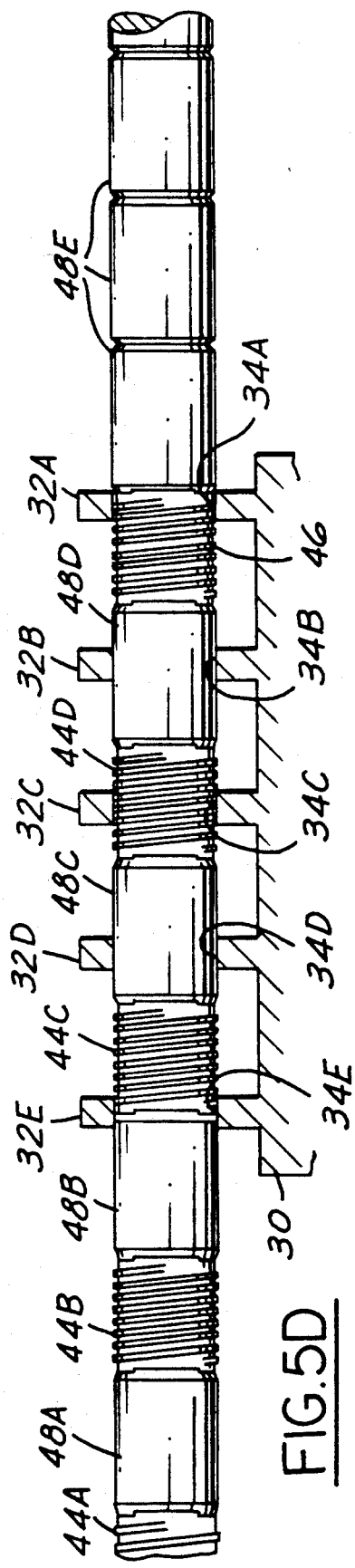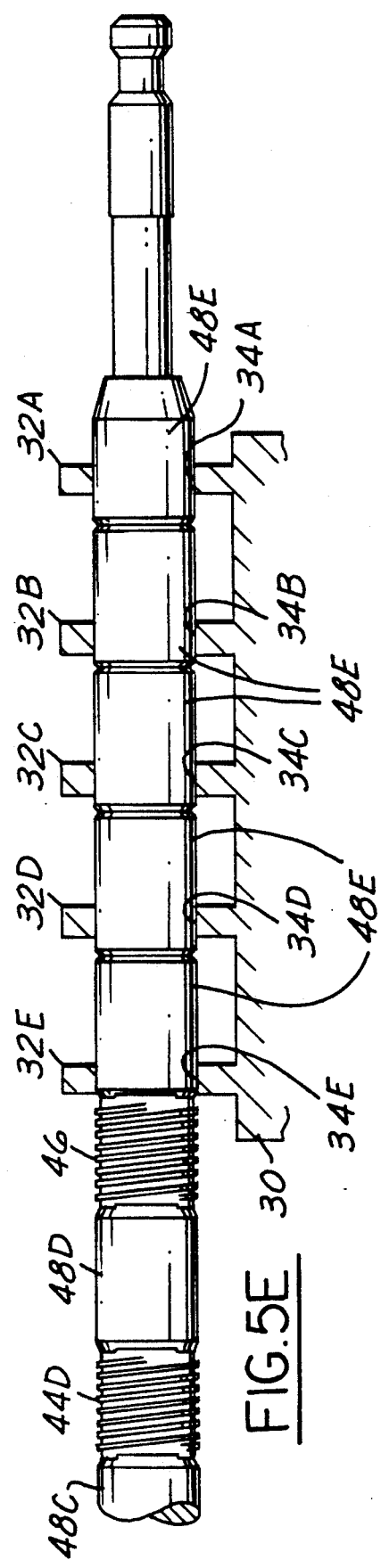

TOOLING SYSTEM AND METHOD FOR BROACHING ENGINE COMPONENTS

BACKGROUND OF THE INVENTION

1. Field of the Invention

This invention relates to a broaching tool and an associated method of broaching a plurality of coaxial bearing bores contained within a component for an internal combustion engine.

2. Disclosure Information

The manufacturing processes used for machining internal combustion engine components have included broaching for many years.

U.S. Pat. No. 4,294,568 to Lipowsky et al. discloses a broaching process for producing grooves for retaining blades on the rotor of a gas turbine engine.

U.S. Pat. No. 4,382,731 to Rigdon discloses a rotary broaching device for machining the flat surfaces required on a cylinder block, or cylinder head, of an internal combustion engine.

U.S. Pat. No. 4,693,813 to Takeshita et al. discloses a broaching method for finishing the rotors of a Roots-type blower found many two-stroke cycle Diesel engines.

Finally, U.S. Pat. No. 768,904 to Schmid discloses a broaching machine for finishing cylindrical surfaces, such as an engine crankshaft.

None of the broaching systems cited above is adaptable for machining the bearing bores found in an engine block for crankshaft bearings, or the bores found in cylinder heads or cylinder blocks for camshaft bearings. Although broaching has been used to finish such components as gears and other devices, broaching has not been used for finishing such devices as engine blocks because of difficulty associated with radial drifting of the broach bar as it is moved through axially separated bearing bores, such as those which support a crankshaft or camshaft At one time, almost all automotive engine blocks, including the crankshaft bore areas, were constructed of cast iron. Commonly, cast iron bearing caps were used for the purpose of retaining the crankshaft and its associated bearings within the engine block. Machining of the crankshaft bearing bores in such case presented no particular problem because the machine tooling was required to work only with cast iron. For several reasons not important to the present invention, automotive manufacturers are now turning in increasing numbers to light metal alloy cylinder blocks made of alumium alloys and other types of alloys. It has been found, however, that light metal alloy bearing caps sometimes have insufficient strength for the demanding requirements of modern engines. As a result, iron alloy main bearing caps are frequently used along with a light metal alloy cylinder block. This type of main bearing bore construction presents a problem inasmuch as the finishing tools traditionally used for bearing bores are not able to maintain truly concentric bearing bores without much difficulty. This fact arises because the light metal alloy cylinder block, being softer than the cast iron bearing cap, will be preferentially removed by traditional cutting tools, and this will cause the bore to drift in the direction of the light alloy cylinder block. Bore drift is undesirable because excessive engine noise will result if the main bearings are not all coaxial.

It is an object of the present invention to provide a tooling system and method for machining main bearing and other coaxial bearing bores contained within a component for an internal combustion engine using a broach with intermittent pilots. A segmented broach bar according to the present invention will provide significant advantages over known systems for finishing coaxial bearing bores.

FIG. 1 illustrates a prior art boring system having a lead element, 12, with a plurality of cutter inserts, 14, located therein. A plurality of support pads, 16, extend axially from the lead end of the boring bar to the powered end of the bar. The bar shown in FIG. 1 has been used for machining bores for engine camshafts. This bar suffers from a potentially serious drawback, insofar that the bar must be directed initially, or "pointed" properly, in order for the resultant finished bores to be finished properly located. Note in this regard that support pads 16 do not serve to guide the boring bar and do not determine the location of the bored holes; the support pads only follow the path created by lead element 12 and cutter inserts 14. Accordingly, errors in tool placement will be perpetuated, if not exaggerated, as the bar moves through successive bearing bores. And, this bar is prone to dimensional errors arising from the problems associated with machining of dissimiliar metals.

FIG. 2 illustrates a boring arrangement, used for machining crankshaft main bearing bores, in which a boring bar, 18, having a plurality of cutter inserts, 20, is simply supported between a boring machine spindle mounting face, 24, and an outboard bushing arrangement, 22. The bar is shown as passing through a series of five main bearing bores, 21. This arrangement suffers from several problems. First, insofar as the boring bar is not piloted at any position intermediate outboard bushing 22 and spindle mounting face 24, the problems associated with dissimilar metal machining will cause the bar to deflect and the resulting bored surfaces will lack the concentricity and roundness generally desirable for use with an engine crankshaft. Moreover, the alignment of outboard bushing 22 is critical if the proper placement of the finished bearing bores is to occur. Also, equipment of this type requires three longitudinal passes to create the final bored surface, and this increases machine time. Finally, the machined surfaces produced by the boring bar are generally too rough for usage without further finishing and must be microsized by a tool such as that shown in FIG. 3. The tool of FIG. 3 includes a bar, 26, having diamond inserts, 28, which are used to microsize, or finish, a previously machined bore. The microsizing bar generally removes approximately 0.0002 to 0.0005 inches of material on diameter. If the stock removal is increased above this rate, the bore's centerline will begin to distort due to aluminum being preferentially removed. In sum, prior art boring systems require multiple passes with different tooling and do not produce adequate results in terms of precision and repeatability, particularly when dissimilar metal machining is involved.

It is an object of the present invention to Provide a machining system for crankshaft bores, camshaft bores and other axially separated bores within internal combustion engine components which will produce coaxial bearing bores having true circular configurations.

It is another object of the present invention to provide a machining system for multiple bearing bores which will produce the finished bore with one pass of a machining tool, as opposed to multiple passes required by prior art devices.

SUMMARY OF THE INVENTION

A segmented broach bar for machining a plurality of coaxial bearing bores contained within a component for an internal combustion engine includes a plurality of axially separated pilot segments and a plurality of axially separated broaching segments, with at least one of the pilot segments being positioned between a pair of the broaching segments. The broach bar preferably has a lead end which first engages the bearing bores, with the broaching and pilot segments having diameters which are sized progressively greater as the distance from the lead end increases, and with the broach and pilot segments being sized such that each broach segment upon passing through a bearing bore produces a bore diameter which accommodates an immediately following pilot segment. The pilot segments have axial lengths and axial spacings according to the lengths and axial spacings of the bearing bores which are being machined, such that the broach bar is supported on at least one pilot segment by at least one of the bearing bores when at least one of the broaching segments is in contact with another one of the bearing bores. Preferably, each broaching segment is supported by at least two of said pilot segments whenever the broaching segment is in contact with at least one of the bearing bores.

According to another aspect of the present invention, a method of machining a plurality of separated, coaxial shaft bearing bores located within a component for an internal combustion engine comprises the steps of (1) mounting the component in a broaching machine, and (2) passing a segmented broach bar, having a plurality of axially separated broaching segments, through the shaft bearing bores while piloting the broach bar within the bearing bores by means of a plurality of pilot segments integrated in the bar. The various broaching and pilot segments are integrated so that at least one of the pilot segments is in contact with at least one of the bearing bores whenever at least one of the broaching segments is in contact with another of the bearing bores. A method and apparatus according to the present invention may be used for machining the main bearing bores of an internal combustion engine if main bearing caps are first mounted to the cylinder block of the engine and then a broach bar, according to the present invention, is passed through the main bearing bores while piloting the broach bar within the bores by means of the pilot segments integrated in the bar.

A broach bar, according to the present invention, may be built up with pairs of broaching and pilot segments having diameters which are sized progressively greater as the distance from a lead end increases, with the individual broach and pilot segments being sized such that each broach segment produces a bore diameter accommodating its paired pilot segment.

BRIEF DESCRIPTION OF THE DRAWINGS

FIG. 1 illustrates a previously described prior art boring bar in which an initial lead element 12 having a plurality of cutter inserts 14 is run without piloting through a series of coaxial bearing bores. While running through the bearing bores, the bearing bar is supported by support pads 16, which, as noted above, cannot correct an improperly bored hole, once the boring has occurred.

FIG. 2 illustrates a piloted prior art boring bar which is previously described and which suffers from several deficiencies, including location errors because outboard bushing 22 of FIG. 2 must be precisely located in order to assure that the bearing bores are placed in the precise location required.

FIG. 3 illustrates a prior art microsizing tool which is suitable for removing only a small amount of stock because of the problem with preferential machining in the event that dissimilar metals are used in the component being bored.

FIG. 4 illustrates an engine block and broaching machine according to one aspect of the present invention.

DETAILED DESCRIPTION OF THE PREFERRED EMBODIMENTS

Figure 5A:
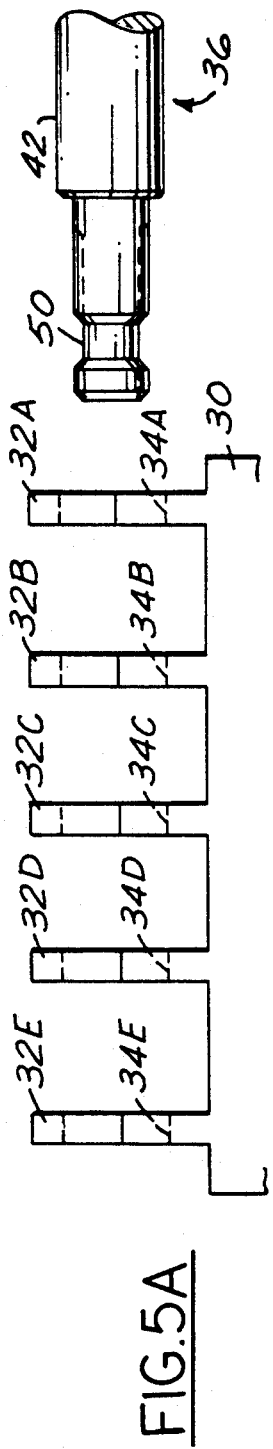
FIG. 5 illustrates the passage sequence of a broach bar, according to the present invention, moving through a five main bearing engine block while machining the main bearing bores in the block.

As shown schematically in FIG. 4, engine block 30 has a plurality of main bearing bores 34A, B, C, D, and E. The bores are defined in part by main bearing caps 32A, B, C, D, and E. The engine block, with the main bearing caps attached, is mounted within a broaching machine, 38, with the engine block located upon table 40 thereof. A broach bar, 36, is shown as being passed through main bearing bores 34. Broaching machine 38 rotates broach bar 36 about its longitudinal axis by means of motor 41, while simultaneously moving bar 36 axially through the workpiece. In usual fashion, the main bearing bores are defined either by casting of the cylinder block 30 and main bearing caps 32 or by forging these parts or by some type of rough machining process which generally defines the bearing bores while not finishing the bores to the desired final dimensions.

It has been determined that a spiral gullet broach, which rotates approximately 360° while passing through the component being machined, is a preferred means for practicing the present invention. The broach bar is preferably pulled through the engine block by the broaching machine.

Figure 5B:
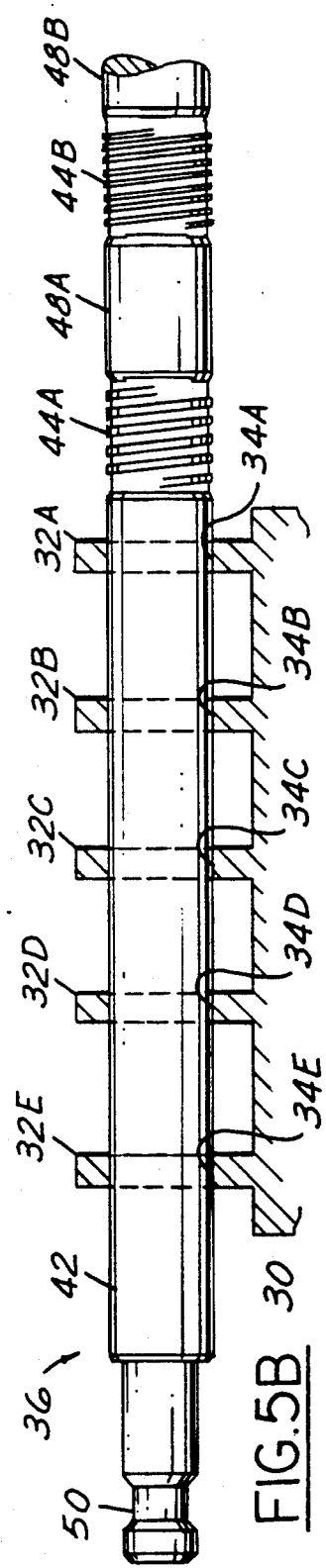

FIGS. 5A–5E show a sequence for passing a broach bar according to the present invention through an engine block having five main bearings, while using a method according to the present invention. Beginning with FIG. 5A, an engine cylinder block 30, having main bearing bores 34A–34E and main bearing caps 32A–32E, is approached by broach bar 36. (For clarity, broaching machine 38 is not shown in FIG. 5). In FIG. 5B, the lead end of the bar, 42, has entered into main bearing bores 34 and is piloting the bar upon all five of the bores. Also in FIG. 5, broaching segment 44A is approaching the first main bearing bore, 34A. Note that broaching segment 44A is followed by pilot segment 48A. Pilot segment 48A is sized precisely to the diameter of the bore left behind by broaching segment 44A so that pilot segment 48A will support broach bar 36 as the bar moves through the main bearing bores seriatim.

Figure 5C:
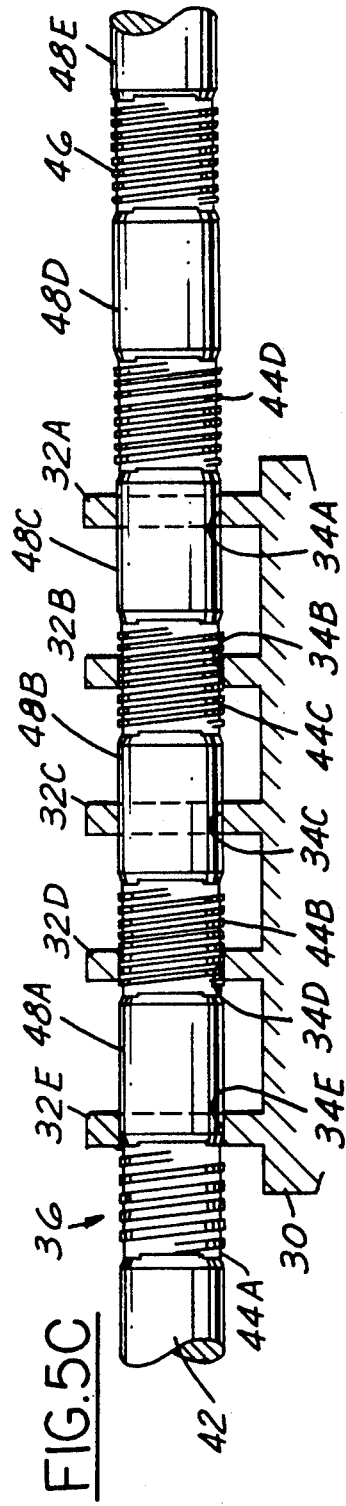

FIG. 5C illustrates the position of bar 36 after broaching segment 44A has passed through all the main bearing bores. Note that broaching segment 44B has passed through main bearing bores 34A, 34B, 34C, and partly through bore 34D. As shown in FIG. 5C, broach bar 36 is piloted upon pilot 48C within bore 34A and pilot 48B within main bearing bore 34C, as well as a portion of pilot 48A within main bearing bore 34E. Accordingly, broach bar 36 is supported by a total of three pilot segments. From FIG. 5C, it is readily observed that the broaching segments which are actively engaged with the bearing bores—i.e., segments 44B and C, are supported between pairs of adjacent pilot segments. As a result, problems previously associated with boring of dissimilar metals will be obviated. Of course, those skilled in the art will appreciate in view of this invention that main bearing caps 32A, B, C, D, and E need not be constructed of metal which is dissimilar from the metal of engine block 30 in order to use the present invention, it being understood that a method and apparatus according to the present invention is equally useful with respect to engine arrangements in which the same metals are used for all portions of the bearing bore.

Turning now to FIG. 5D, it is noted that broaching segment 44C is about to enter main bearing bore 34E, and when this occurs, the broaching segment will be piloted by broaching segment 48C, which as noted above, has a diameter which is matched to the bore diameter produced by broaching segment 44C, such that broaching segment 44C will be piloted by pilot segment 48C. Similarly, broaching segment 44D, which is illustrated as Passing in FIG. 5D through main bearing bore 34C, is piloted by pilot segment 48C, passing through main bearing bore 34D and pilot segment 48D, which is passing through main bearing bore 34B. Those skilled in the art will appreciate in view of this disclosure that the number of broaching and pilot segments and their respective axial lengths may be selected to correspond with bearing bores having various axial lengths and spacings, so as to assure that bar 36 is adequately supported throughout its passage through a workpiece.

FIG. 5E illustrates burnishing segment emerging from bore 34E. The burnishing segment produces a relatively smooth surface without the need for additional operations.

From FIG. 5, it is clear that a broaching bar according to the present invention is comprised of a plurality of axially separated pilot segments with at least one broaching segments being positioned between successive pairs of the pilot segments. It is equally clear that the paired broaching and pilot segments are sized to one another. As the bar passes through the engine block, the bearing bores are opened progressively to their final diameter. This occurs because broaching segment 44D has a larger diameter than segments 44A, B, and C. Similarly, the diameter produced by broaching segment 44C is greater than the diameters produced by segments 44A and B. Accordingly, the main bearing bores are opened to their final diameter and then burnished by burnishing segment 46, which comprises the last machining segment of the broaching bar passed through the main bearing bores. Burnishing segment 46 is followed by a plurality of additional pilot segments 48E which serve to support and guide the broaching bar during the passage of burnishing segment 46 through the main bearing bores.

Various segments, broaching and pilot, are preferably built up on the bar in pairs, sized such that each broaching segment produces a bore diameter which accommodates the immediately following pilot segment. Using a modular concept of adding pairs of broaching and pilot segments, damaged or worn broaching segments may be replaced without the necessity of replacing the remaining broaching segments. To permit the broaching and pilot segments to be rotated as the bar passes through the workpiece, each broaching and pilot segment is provided with a set of internal splines which lock each broach and pilot segment to the core of the bar, 50.

Although the present broaching bar is shown as being used to machine the main bearing bores of an engine block, a broaching bar and method according to the present invention may be used for machining camshaft bores and other types of axially separated, coaxial bearing bores contained within a component for an internal combustion engine.

This and all other modifications may be made without departing from the scope of the invention as defined by the appended claims.

I claim:

1. A segmented broach bar for machining a plurality of coaxial bearing bores contained within a component for an internal combustion engine, comprising:
   a plurality of axially separated pilot segments; and
   a plurality of axially separated broaching segments, with at least one of said pilot segments being positioned between a pair of said broaching segments, with said broach bar having a lead end which first engages said bearing bores, with the broaching and pilot segments having diameters which are sized progressively greater as the distance from the lead end increases, with the broach and pilot segments being sized such that each broach segment produces a bore diameter which accommodates the immediately following pilot segment and with said lead end having a pilot segment which first engages said engine component.

2. A segmented broach bar for machining a plurality of coaxial bearing bores having defined axial spacings within a component for an internal combustion engine, comprising:
   a plurality of axially separated broaching segments; and
   a plurality of axially separated pilot segments, with at least one of said broaching segments being positioned between successive paris of said pilot segments, and with said pilot segments having lengths and axial spacings according to the lengths and axial spacings of said bearing bores such that the broach bar is supported on at least two pilot segments when at least one of said broaching segments is in contact with one of said bearing bores.

3. A method of machining a plurality of separated, coaxial shaft bearing bores located within a component for an internal combustion engine, comprising the steps of:
   mounting the component in a broaching machine; and
   passing a segmented broach bar, having a plurality of axially separated broaching segments, through the shaft bearing bores while piloting the broach bar within the bearing bores by means of a plurality of pilot segments integrated in said bar, such that at least one of said pilot segments is in contact with at least one of said bearing bores whenever at least one of said broaching segments is in contact with another of said bearing bores and further such that one of said pilot segments first engages said engine component.

4. A method according to claim 3 wherein the bar has a lead end which first engages said bearing bores, with the broaching and pilot segments having diameters which are sized progressively greater as the distance from the lead end increases, with the broach and pilot segments being sized such that each broach segment produces a bore diameter which accommodates the immediately following pilot segment.

* * * * *